United States Patent [19]
Tanaka

[11] Patent Number: 5,808,831
[45] Date of Patent: Sep. 15, 1998

[54] DISK DRIVING APPARATUS WITH REDUCED SITE AND THICKNESS

[75] Inventor: Jun Tanaka, Saitama-ken, Japan

[73] Assignee: Canon Denshi Kabushiki Kaisha, Saitaman-ken, Japan

[21] Appl. No.: 864,056

[22] Filed: May 27, 1997

Related U.S. Application Data

[63] Continuation of Ser. No. 386,138, Feb. 9, 1995, abandoned.

[30] Foreign Application Priority Data

| Jul. 30, 1992 | [JP] | Japan | 4-053644 U |
| Jul. 30, 1992 | [JP] | Japan | 4-053645 U |
| Sep. 7, 1992 | [JP] | Japan | 4-062678 U |
| Sep. 16, 1992 | [JP] | Japan | 4-064540 U |

[51] Int. Cl.⁶ .................................................. G11B 17/04
[52] U.S. Cl. .................................. 360/99.06; 360/99.02
[58] Field of Search .......................... 360/99.06, 99.02, 360/99.03, 99.07, 97.01; 369/77.1, 77.2

[56] References Cited

U.S. PATENT DOCUMENTS

| 4,656,542 | 4/1987 | Shibata | 360/99.06 |
| 4,878,139 | 10/1989 | Hasegawa et al. | 360/99.02 |
| 5,060,101 | 10/1991 | Isomura | 360/99.06 |
| 5,144,508 | 9/1992 | Noda et al. | 360/99.06 |
| 5,202,861 | 4/1993 | Yoshida | 360/99.06 |
| 5,222,005 | 6/1993 | Inoue | 360/105 |
| 5,237,473 | 8/1993 | Yoshida | 360/99.06 |
| 5,343,457 | 8/1994 | Hoshi | 369/77.2 |

FOREIGN PATENT DOCUMENTS

| 61-123052 | 6/1986 | Japan | 360/99.06 |
| 61-250869 | 11/1986 | Japan | 360/99.07 |

*Primary Examiner*—Stuart S. Levy
*Assistant Examiner*—David L. Ometz
*Attorney, Agent, or Firm*—Robin, Blecker & Daley

[57] ABSTRACT

The present invention relates to a mechanism for solving problems involved in miniaturizing a disk driving apparatus. A pin provided on a latch lever for latching a cassette guide has a movement restricting part on its top to prevent the pin and a stopper from disengaging from each other in a direction perpendicular to the direction of disk insertion. When a cassette is placed in an ejected state wherein the amount of projection of the cassette from a panel is approximately the same as the amount of projection of a push button from the panel, a recess formed in the pin and the stopper engage with each other so that the cassette can be reliably ejected. Further, the cassette guide has, on opposite sides thereof, inserting guides for guiding insertion of the cassette, and a portion corresponding to a movement path portion for a head is eliminated from the cassette guide to form a space which serves as a movement path space for the head. The inserting guide of the cassette guide, which is positioned on a side on which the space is formed, has a projection on its rearmost end portion so that the cassette can be supported on the projection.

3 Claims, 14 Drawing Sheets

F I G. 7(a)
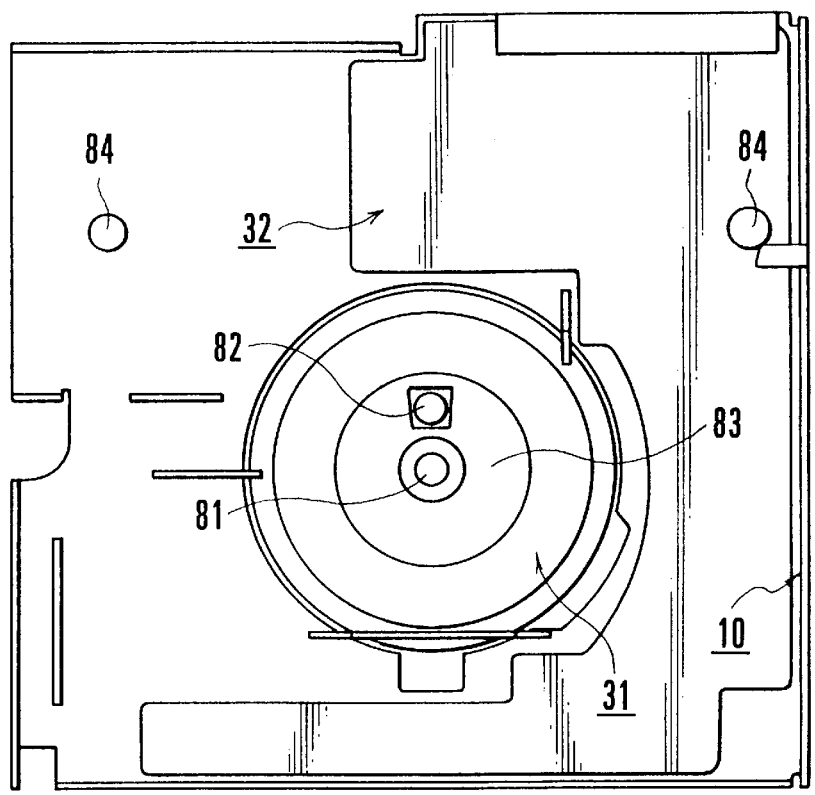
F I G. 7(b)
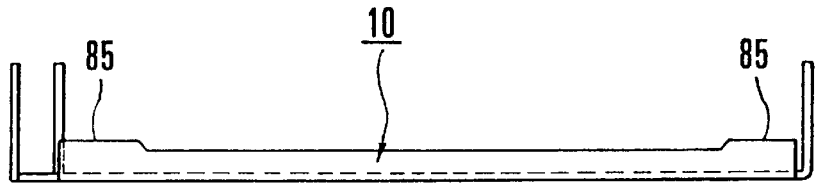
F I G. 7(c)
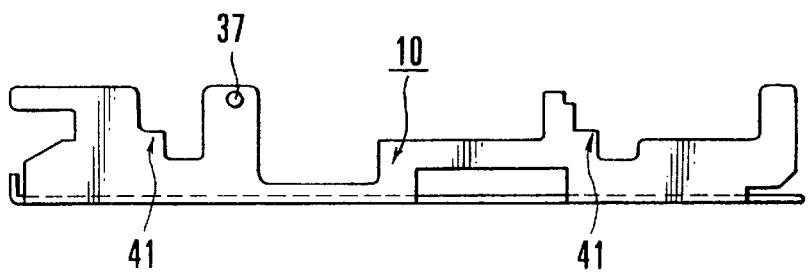

DISK DRIVING APPARATUS WITH REDUCED SITE AND THICKNESS

This is a continuation application under 37 CFR 1.62 of prior application Ser. No. 08/386,138 filed on Feb. 9, 1995 abandoned.

BACKGROUND OF INVENTION:

1. Field of the Invention:

The present invention relates to a disk driving apparatus for recording or reproducing information on or from a rotating disk and, more particularly, to a structure for solving drawbacks involved in miniaturizing the disk driving apparatus.

2. Description of the Related Art:

The above-described disk driving apparatus is, for example, an apparatus for performing recording or reproduction of information on or from a disk-like recording medium, such as a magnetic disk or a laser disk. Such an apparatus is generally arranged to operate in the following manner. When a disk which serves as a recording medium is externally inserted into the disk driving apparatus, the inserted disk is set in an ejectable state and starts to rotate by the driving of a motor. Recording or reproduction of information on or from the rotating disk is carried out by causing a head to move in contact with or in proximity to the rotating disk. In this arrangement, the head is provided on a carriage so that the head is made to move (seek) in the radial direction of the disk by the motor.

The above-described disk driving apparatus has a base for supporting various constituent members such as inserting/ejecting means for performing insertion or ejection of a disk cassette, disk rotation driving means for causing the disk to rotate by the motor, head seek means for causing the head to move to an arbitrary track position in the radial direction of the disk, and head loading means for loading or unloading the head onto or from the disk. Further, a control circuit for controlling the entire disk driving apparatus, a connector for an electrical power source and the like are provided on the base, and the control circuit is connected to a host machine and the like through an interface.

In some cases, such a disk driving apparatus is constructed as an independent apparatus for use as an external storage unit for an electronic apparatus such as a personal computer or a word processor. However, in general use, the disk driving apparatus is incorporated into the body of the electronic apparatus. To provide a far smaller, portable electronic apparatus, there has been a strong demand for reductions in the size, weight and thickness of the above-described disk driving apparatus.

Some types of apparatus which are reduced in size, weight and thickness have been proposed. However, such an apparatus has a number of problems to be described below because its mechanism is simplified for the purpose of achieving reductions in size, weight and thickness.

In many of these types of apparatus, a so-called front loading system is adopted in which a disk cassette is inserted from the front face of the apparatus, and a front panel in which a cassette inserting slot is formed is provided on the front face of the apparatus. The front panel is also provided with an eject button for ejecting an inserted disk cassette from the apparatus by a pressing operation. By operating the eject button, a cassette guide to which the disk cassette is secured can be moved from the position at which information can be recorded and reproduced on and from the disk toward a cassette ejectable position. A latch mechanism is provided for permitting or limiting the movement of the cassette guide therebetween.

In the above-described disk driving apparatus, if an operator is to eject the disk cassette inserted in the apparatus, the operator manually presses the eject button which is projected by a predetermined amount. However, since the cassette inserting slot for insertion and ejection of the disk cassette is positioned in proximity to the eject button, the operator's finger may intercept the cassette inserting slot during an eject-button pressing operation. In other words, the operator's finger may stop the movement of the disk cassette which is being ejected. By this operation, the state of the latch mechanism at that time is held so that the operation of the cassette guide is made to stop halfway during the movement and the ejection of the disk cassette also comes to a stop halfway.

During this state, the cassette guide is not completely placed in an unloaded state and the head is not completely separated from the disk. Accordingly, if the disk cassette which projects one edge from the cassette inserting slot by a small amount is forcedly pulled out, there is a possibility that the head may break by interference with the disk cassette.

The aforementioned latch mechanism needed for causing the cassette guide to move upward and downward in the disk driving apparatus is arranged to operate by bringing the pin of a latch lever provided on the upward/downward movable cassette guide and a stopper fixedly provided on the base into and out of engagement with each other.

In the above-described arrangement, it is necessary to cause the cassette guide to move downward by a predetermined amount. If a mechanism is adopted in which the pin and the stopper are kept in abutment with each other at all times and in which the pin can abut on the stopper over its entire length, the positions of engagement between the pin and the stopper which respectively correspond to the load and unload positions of the disk cassette need to be set to the positional limits within which the pin and the stopper can maintain their abutment relationship.

However, in the above-described structure, since the positions of engagement between the pin and the stopper which respectively correspond to the load and unload positions of the disk cassette are set to the positional limits within which the pin and the stopper can maintain their abutment relationship, the state of engagement between the pin and the stopper is occasionally influenced by the accuracy of processing of each part or the accuracy of assembly of parts. For example, as shown in FIG. 6(d), when a cassette guide 115 is placed in its loaded state, a pin 129 occasionally moves into a location below a stopper 128, with the result that the cassette guide 115 is unable to return to the unloaded state shown in FIG. 6(c).

Many of the disk driving apparatuses adopt a structure which interlocks the operation of loading and unloading the head onto and from a disk with the movement of the cassette guide. In this structure, the cassette guide moves while being guided along a guide groove formed in a side wall of the base.

In such a disk driving apparatus, the shape of the cassette guide performs an important role for permitting the cassette guide to move smoothly along the side wall of the base. However, if the accuracy of processing of the cassette guide is not sufficient, the head may fail to be completely unloaded.

Also, the unload position of the head depends on the accuracy of processing and assembly of each individual part.

If such an accuracy is not sufficient, the unload position of the head may be lower than a predetermined position and a recording medium comes into contact with the head during insertion.

SUMMARY OF THE INVENTION:

A primary object of the present invention is to provide a disk driving apparatus which is reduced in size and thickness as well as a disk driving apparatus having an arrangement capable of solving problems involved in reducing in the size and thickness of the apparatus.

One specific object of the present invention is to provide a disk driving apparatus capable of preventing, by a simple arrangement, a disk cassette from stopping halfway during ejection.

Another specific object of the present invention is to provide a disk driving apparatus having a stably operative, ejecting mechanism capable of preventing, by a simple arrangement, a head from being damaged while a disk cassette is being taken out of the apparatus.

Another specific object of the present invention is to provide a disk driving apparatus having a stably operative, loading mechanism capable of reliably operating a latch mechanism by a simple arrangement.

A further specific object of the present invention is to provide a disk driving apparatus capable of stably moving a head to an unload position by a simple arrangement and capable of keeping the gap between the head and an opposing head constant irrespective of the position of the head in the radial direction of a disk when the head is placed in the unload position.

To achieve the above objects, in accordance with one aspect of the present invention, there is provided a disk driving apparatus which is arranged to record or reproduce information on or from a recording medium of disk-like shape accommodated in a cassette, by causing a head to move in a predetermined direction while causing the recording medium to rotate. The disk driving apparatus comprises a cassette guide for receiving the cassette, the cassette guide having, on opposite sides thereof, inserting guides for guiding insertion of the cassette, a portion corresponding to a movement path portion for the head being eliminated from the cassette guide to form a space which serves as a movement path space for the head, the inserting guide of the cassette guide, which is positioned on a side on which the space is formed, having a projection on its rearmost end portion so that the cassette can be supported on the projection; a base for holding the cassette guide movably in an inserting direction of the cassette and in a direction perpendicular to the inserting direction so as to cause the cassette to move between a load position and a standby position; a head carriage which holds a first head and a second head and which is movable in a radial direction of the recording medium, the head carriage having a head arm for holding the second head in opposition to the first head, the head carriage being disposed in such a manner that a longitudinal direction of the head carriage is approximately perpendicular to a moving direction of the head carriage; moving means for causing the second head to move between a first position where recording or reproduction of information on or from the recording medium is possible and a second position wherein recording or reproduction of information on or from the recording medium is impossible, the moving means having a supporting portion for supporting the head arm transversely to the moving direction of the head carriage when the second head is positioned in the second position, a part of the supporting portion being provided with a supporting-portion holding member having an elastic part, the supporting portion having a plurality of shafts of different diameters which are eccentrically and axially connected to each other; a panel attached to the base and having an opening for insertion of the cassette and a push button which operably projects from the panel, the push button having a variable amount of projection which varies between the standby position and the load position of the cassette; transporting means for executing, when the push button is pressed, a transporting operation for transporting the cassette guide to cause the cassette to move from the load position to the standby position; ejecting means for ejecting the cassette in interlocked relation to the transporting operation; a stopper provided on the base; a latch lever turnably supported on the cassette guide; a pin provided on the latch lever, the pin having a movement restricting part on its top to prevent the pin and the stopper from disengaging from each other in the direction perpendicular to the inserting direction, the pin and the stopper being engaged with each other when the cassette is in an ejected state wherein the amount of projection of the cassette from the panel is approximately the same as the amount of projection of the push button from the panel; and urging means for urging the latch lever in a direction in which the pin is brought into abutment with the stopper at all times.

The above and other objects, features and advantages of the present invention will become apparent from the following detailed description of a preferred embodiment of the present invention, taken in conjunction with the accompanying drawings.

BRIEF DESCRIPTION OF THE DRAWINGS:

FIGS. 7(*a*) to 7(*c*) are diagrammatic views showing the arrangement of parts mounted on the bottom of a base of the disk driving apparatus of FIG. 1, FIG. 7(*a*) being a top plan view, FIG. 7(*b*) being a front elevational view taken along line B—B of FIG. 7(*a*), and FIG. 7(*c*) being a side elevational view taken along line C—C of FIG. 7(*a*);

Figure 1:
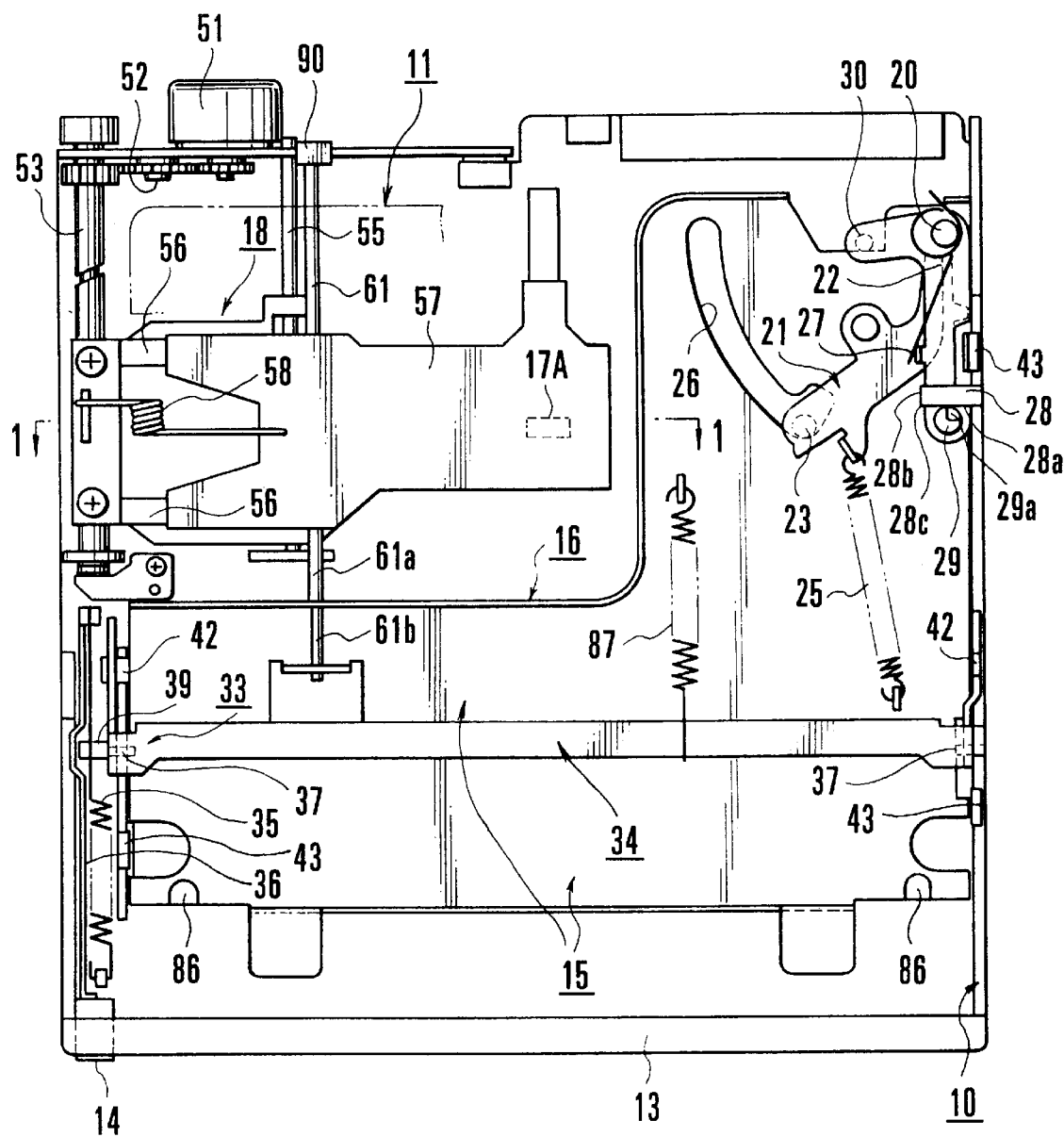
FIG. 1 is a diagrammatic top plan view, with a cover omitted for the sake of clarity, of the state of one embodiment of a disk driving apparatus according to the present invention when a disk cassette is in its unload position.
Figure 2:
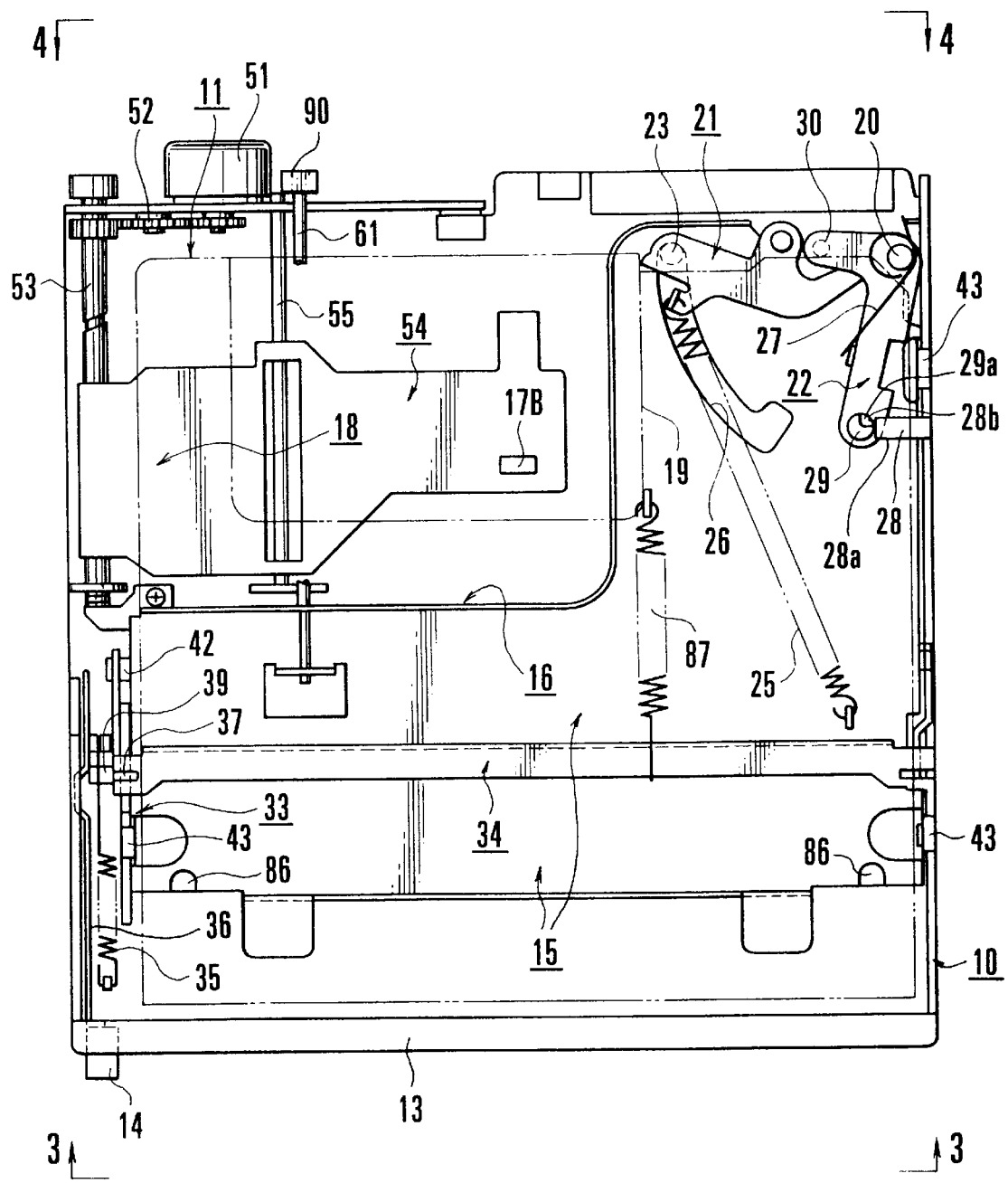
FIG. 2 is a diagrammatic top plan view, with the cover omitted for the sake of clarity, of the state of the disk driving apparatus of FIG. 1 when the disk cassette is in its load position.
Figure 3:
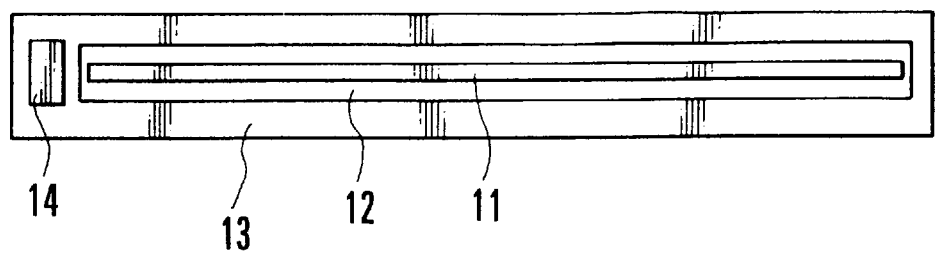
FIG. 3 is a front elevational view of the disk driving apparatus, taken along line 3—3 of FIG. 2.
Figure 4:
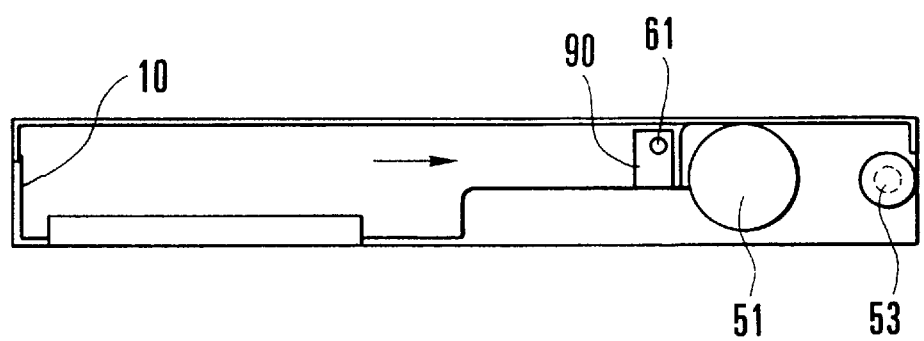
FIG. 4 is a rear elevational view of the disk driving apparatus, taken along line 4—4 of FIG. 2.

DETAILED DESCRIPTION OF THE PREFERRED EMBODIMENT:

A preferred embodiment of the present invention will be described below with reference to the accompanying drawings. Throughout all the drawings that will be referred to below, the same reference numerals are used to denote the same or similar elements. FIGS. 1 and 4 are diagrammatic views showing one embodiment of a disk driving apparatus to which the present invention is applied. FIG. 1 is a diagrammatic top plan view, with a cover omitted for the sake of clarity, of the arrangement of internal elements of the disk driving apparatus in which a disk cassette is placed in its unload position. FIG. 2 is a top plan view similar to FIG. 1, and shows the arrangement of the internal elements of the disk driving apparatus in which the disk cassette is placed in its load position. FIG. 3 is a front elevational view of the disk driving apparatus, taken along line 3—3 of FIG. 2. FIG. 4 is a rear elevational view of the disk driving apparatus, taken along line 4—4 of FIG. 2.

Various constituent parts are accommodated in a base 10 having a box-like shape with a top side open, as shown in FIGS. 1 and 2. The base 10 is formed as a thin structure made of a metal such as aluminum, and the top side of the base 10 is covered with a cover (not shown) formed of a thin plate made of a non-magnetic material, such as aluminum, for the purposes of magnetic shielding and dust protection. A front panel 13 is attached to the base 10 at the front face thereof. As shown in FIG. 3, the front panel 13 has a cassette inserting slot 12 for permitting insertion and ejection of a disk cassette 11. A push button (eject button) 14 which is operated to eject the inserted disk cassette 11 is provided in the left-hand end portion of the front panel 13 as viewed in FIG. 3.

Referring again to FIGS. 1 and 2, a cassette guide 15 for guiding the disk cassette 11 during insertion, ejection, loading and unloading is held in the base 10 in such as manner as to be movable in the upward and downward directions as well as in the forward and rearward directions. The cassette guide 15 has a cross-sectional shape which serves to guide and hold the disk cassette 11 inserted from the forward direction. In the shown example, the cassette guide 15 has an approximately square, but partially cut out shape as viewed in top plan, that is to say, a cutout portion 16 is formed in the cassette guide 15 by removing an approximate left half of a rear portion thereof (i.e., an area equivalent to approximately ¼ of the entire area of the cassette guide 15).

The cassette guide 15 is held in a position which is displaced to the right with respect to the position of the base 10 (i.e., a position which is relatively offset from that of the base 10 toward the right side). A portion in the base 10 that is adjacent to the left-hand edge of the cassette guide 15 is formed as a space in which other constituent parts are disposed.

Figure 5:
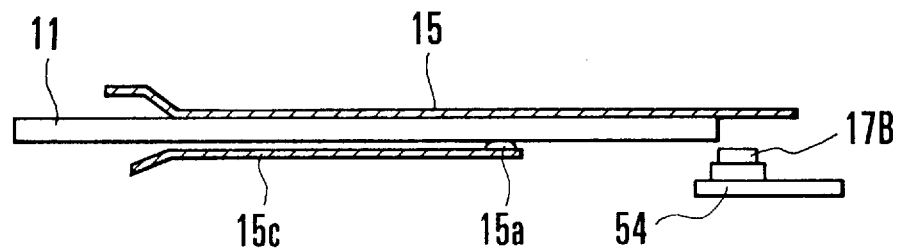
FIG. 5 is a schematic cross-sectional view of a cassette guide according to the present embodiment.

As shown in FIG. 5, at least one projection 15a is provided at the rearmost end of a guide rail part 15c of the cassette guide 15 relative to the direction of disk-cassette insertion, the guide rail part 15c being located in an area closer to the side on which the space is formed. The projection 15a is formed at the same time that the cassette guide 15 is pressed, and the tolerance between the upper face of the disk cassette 11 and the lower face of the cassette guide 15 when the disk cassette 11 is inserted is set to approximately 0.2 mm.

As shown in FIGS. 1 and 2, a head seek mechanism 18, which has head means 17 (an upper head 17A and a lower head 17B) for effecting recording or reproduction of information on or from a disk (information medium) accommodated in the disk cassette 11, is disposed in an area corresponding to the cutout portion 16 of the cassette guide 15. The head seek mechanism 18 is a mechanism for causing the head means 17 to move to an arbitrary track position (for the purpose of a seek operation) on the disk in the radial direction thereof.

A magnetic disk is accommodated in the disk cassette 11 as the information medium, and is externally accessible, as by opening a slidable shutter 19 provided on the disk cassette 11 and loading the head means 17 onto the magnetic disk through a corresponding head access opening.

As shown in FIGS. 1 and 2, a vertical shaft 20 is provided on the right-hand rear portion of the cassette guide 15, and a shutter lever 21 and a latch lever 22 are supported by the vertical shaft 20 pivotally on the vertical shaft 20 above the cassette guide 15. The shutter lever 21 serves to open and close the shutter 19 which covers the head access opening of the disk cassette 11, in association with the insertion and ejection of the disk cassette 11. A pin 23, which can be brought into abutment with the leading end of the disk cassette 11, as viewed in the direction of disk-cassette insertion, as well as with one edge of the shutter 19, is provided on the bottom surface of an extending end portion of the shutter lever 21. The shutter lever 21 is urged in the counterclockwise direction (in the direction of left-hand rotation) as viewed in FIG. 1 or 2, by a spring which is held between the shutter lever 21 and the cassette guide 15. A slot 26 is formed in the top of the cassette guide 15, and has a shape of predetermined length according to the locus of movement of the pin 23 so that the pin 23 is allowed to move along the locus of movement.

As shown in FIGS. 1 and 2, the latch lever 22 is urged by a latch spring 27 in the counterclockwise direction (in the direction of left-hand rotation) as viewed in the figures. If the disk cassette 11 is placed in the unload position, a pin 29 provided on one end portion of the latch lever 22 engages with a forward face 28a of a stopper 28 formed on the base 10 so that the latch lever 22 is placed in its latched state, as shown in FIG. 1. The pin 29 has a recess 29a which is engageable with a corner 28c of the stopper 28. The position of the corner 28c corresponds to the uppermost position of the upward movement of the cassette guide 15. Further, the top of the pin 29 is provided with a movement restricting member 29d which is slightly greater than the pin 29 in diameter, as shown in FIG. 6. The other end portion of the latch lever 22 is provided with a pin 30 which can be brought into abutment with the leading end of the inserted disk cassette 11. In the above-described manner, a latch mechanism is disposed on a side of the cassette guide 15 which is opposite to the cutout portion 16, that is, a side of the cassette guide 15 which is opposite to the side on which the above-described head seek mechanism 18 and a cassette loading mechanism 33 (to be described later) are disposed (or, a side of the cassette guide 15 which is opposite to the side on which the space is formed by displacing the cassette guide 15 and the disk cassette 11 to the right in the above-described manner).

FIGS. 7(a), 7(b) and 7(c) are diagrammatic views showing parts mounted on the bottom of the base 10, with the cassette loading mechanism and the head seek mechanism omitted for the sake of clarity. FIG. 7(a) is a top plan view, FIG. 7(b) is a front elevational view taken along line B—B of FIG. 7(a), and FIG. 7(c) is a side elevational view taken along line C—C of FIG. 7(a). As shown in FIGS. 7(a) to 7(c), a disk-like flat motor 31 for disk driving is disposed approximately in the center of the bottom of the base 10, and the motor 31 is provided with a center shaft 81 which engages with the center hole (not shown) of the disk cassette 11, a driving pin 82 which engages with a driving hole (not shown) provided in the vicinity of the center hole of the disk cassette 11, and a magnet 83 for holding the hub of the disk by attraction. Rearward of the motor 31 are disposed positioning pins 84 for positioning the disk cassette 11 when the disk cassette 11 is in its loaded state. Positioning faces 85 are formed on the base 10 by partially raising part of the base 10 which is adjacent to the cassette inserting slot 12 (refer to FIG. 3). A printed circuit board 32 for controlling the disk driving apparatus is disposed around the motor 31.

As shown in FIGS. 1 and 2, the cassette loading mechanism 33 for selectively moving the cassette guide 15 to the load and unload positions is disposed in the space which is formed in the base 10 along the left-hand edge of the cassette guide 15. An operating lever 34 is provided on the base 10, which extends transversely above the cassette guide 15 and which is pivotally supported at its opposite ends on the base 10. A button lever 36 of the cassette loading mechanism 33 is normally urged in the direction of the cassette inserting slot 12 by a return spring 35. If the eject button 14 is pressed, the button lever 36 is moved rearward against the urging force of the return spring 35. The pivotal position of the operating lever 34 is restricted by the button lever 36, and the cassette guide 15 is selectively moved toward the load and unload positions in accordance with the pivotal position of the operating lever 34.

A spring 87 is held between the operating lever 34 and the cassette guide 15 so that the cassette guide 15 is normally subject to an urging force acting in the direction of disk-cassette ejection.

Figure 8:
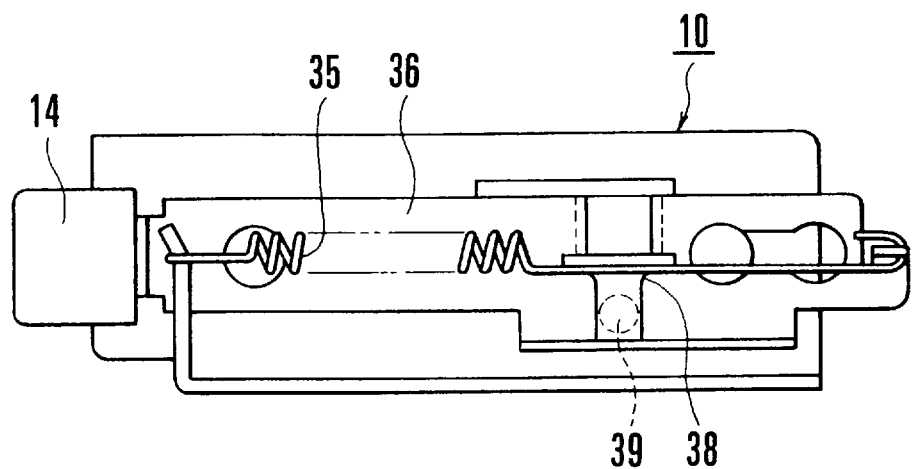
FIG. 8 is a fragmentary side elevational view showing the state of the button lever shown in FIG. 1 when the disk cassette is in the unload position.
Figure 9:
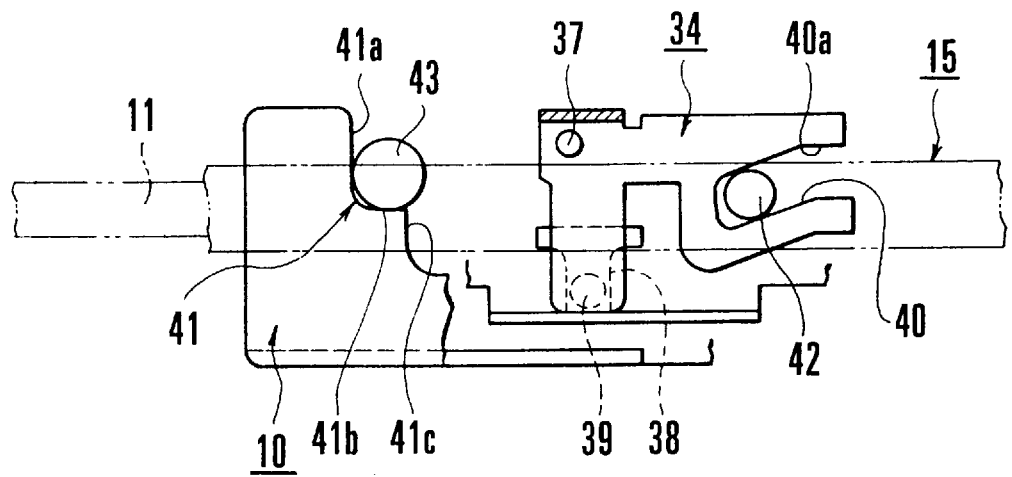
FIG. 9 is a fragmentary side elevational view showing the state of the operating lever and that of the cassette guide shown in FIG. 1 when the disk cassette is in the unload position.
Figure 10:
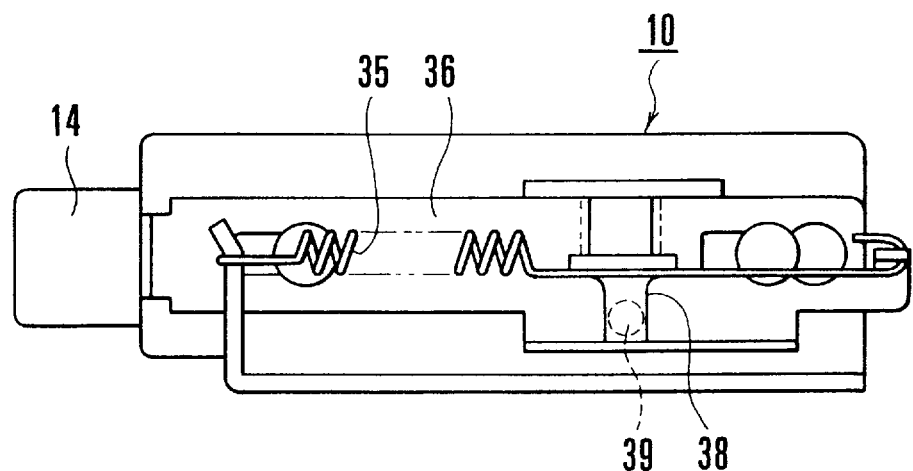
FIG. 10 is a fragmentary side elevational view showing the state of the button lever shown in FIG. 2 when the disk cassette is in the load position.
Figure 11:
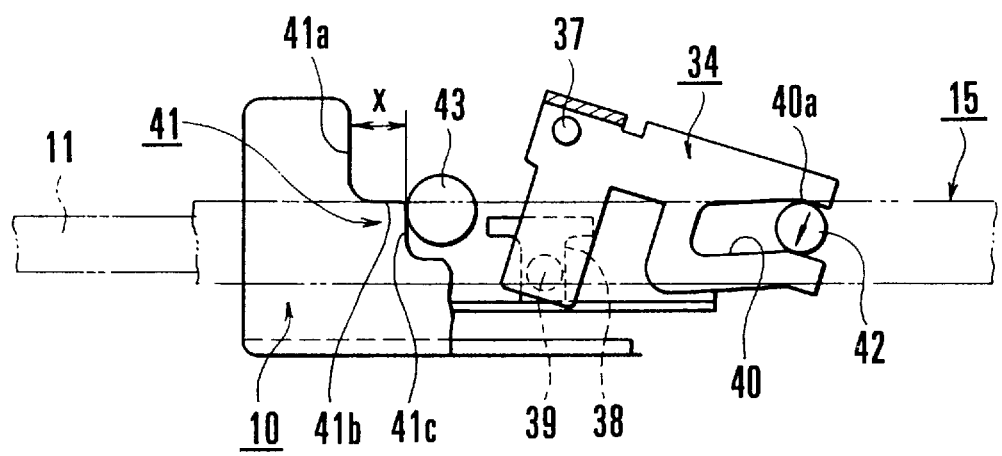
FIG. 11 is a fragmentary side elevational view showing the state of the operating lever and that of the cassette guide shown in FIG. 2 when the disk cassette is in the load position.

FIGS. 8 to 11 are fragmentary side elevational views showing the state of the cassette loading mechanism 33 when the disk cassette 11 is in the load position, as well as the state of the cassette loading mechanism 33 when the disk cassette 11 is in the unload position. FIG. 8 shows the state of the button lever 36 when the disk cassette 11 is in the unload position, FIG. 9 shows the state of the operating lever 36 and that of the cassette guide 15 when the disk cassette 11 is in the unload position, FIG. 10 shows the state of the button lever 36 when the disk cassette 11 is in the load position, and FIG. 11 shows the state of the operating lever 34 and that of the cassette guide 15 when the disk cassette 11 is in the load position.

The aforesaid button lever 36 is supported for sliding motion with respect to the base 10 in the forward and rearward directions thereof by a slide guide portion made up of a pin and a slot, and is normally urged to the left (in the forward direction) as viewed in FIG. 8 by the return spring 35. The operating lever 34 is supported at its opposite ends pivotally on support points 37 provided on the base 10. A cutout 38 formed in the button lever 36 is engaged with a pin 39 provided on one end portion of the operating lever 34.

Cam slots 40 are respectively formed in the opposite end portions of the operating lever 34, and holding parts 41 each having a staircase-like edge portion are provided on the opposite ends of the base 10, respectively. The opposite sides of the cassette guide 15 are respectively provided with center pins 42 as well as rollers 43. The center pins 42 engage with the associated cam slots 40 formed in the opposite end portions of the operating lever 34, and the rollers 43 abut the associated holding parts 41 of the base 10. Since the shape of the cassette guide 15 is such that the approximate left half of the rear portion is cut out as shown in FIGS. 1 and 2, the holding parts 41 and the rollers 43 are provided at a total of three selected locations, one left-hand location and two forward and rearward locations.

The operation of each part during the loading and unloading of the disk cassette 11 will be described below with reference to FIGS. 1 through 10. When the disk cassette 11 is inserted through the cassette inserting slot 12 (refer to FIG. 3), the disk cassette 11 moves along the rail part of the cassette guide 15. Then, the disk cassette 11 moves onto the projection 15a of the rail part 15c (refer to FIG. 5) positioned in the left-hand portion in FIG. 1 and, after that, the disk cassette 11 further moves in the rearward direction with its left-hand portion raised slightly. When the disk cassette 11 is further moved in the rearward direction, the disk cassette 11 moves beyond the rearward end of the left-hand rail part 15c of the cassette guide 15 and the left-hand portion of the leading edge of the disk cassette 11 relative to the direction of disk-cassette insertion tends to fall down. In the meantime, although a force which causes the disk cassette 11 to move upward works thereon in the vicinity of the cassette inserting slot 12, the upward movement of the disk cassette 11 is blocked by the lower face of the upper-side portion of the cassette guide 15. Since a rail part positioned on the right-hand side in FIG. 1 has a substantial guide length, the disk cassette 11 can be inserted in approximately parallel relation to the cassette guide 15, so that the leading edge of the disk cassette 11 is prevented from coming into contact with the lower head 17b. At this time, the leading edge of the disk cassette 11 comes into abutment with the pin 23 of the shutter lever (refer to FIGS. 1 and 2), thereby causing the shutter lever 21 to turn in the clockwise direction shown in FIG. 1 (in the direction of right-hand rotation). At this time, the pin 23 of the shutter lever 21 (refer to FIGS. 1 and 2) is brought into abutment with one edge of the shutter 19 to cause the shutter 19 to move against a return spring (not shown) in accordance with the turn of the shutter lever 21

(the insertion of the disk cassette 11), thereby opening the head access opening. Thus, the head means 17 is allowed to access the disk (medium).

Then, the leading end of the disk cassette 11 comes into abutment with the pin 30 of the latch lever 22 (refer to FIGS. 1 and 2). When the disk cassette 11 is further pressed (in the direction of disk-cassette insertion), the latch lever 22 turns in the clockwise direction (in the direction of right-hand rotation) as viewed in the figures, so that the pin 29 of the latch lever 22 moves along the forward face 28a of the stopper 28 of the base 10 in the clockwise direction and disengages from the forward face 28a of the stopper 28. By the disengagement of the latch mechanism, the cassette guide 15 arrested by the pin 29 is allowed to move further toward the rear end of the apparatus (to the right as viewed in FIG. 9). The position of the leading end of the disk cassette 11 within the cassette guide 15 in the direction of disk-cassette insertion is restricted by the pin 23 coming into abutment with the rearward end of the slot 26 (refer to FIG. 2).

When the disk cassette 11 is further pressed, the cassette guide 15 moves together toward the rear end of the apparatus against the urging force of the spring 87. During this time, the pin 29 of the latch lever 22 moves with the movement of the cassette guide 15 and in the state of being kept in contact with a side face 28b of the stopper 28 by the urging force of the spring 27.

With the movement of the cassette guide 15, the pins 42 of the cassette guide 15 (refer to FIGS. 9 and 11) move horizontally toward the rear end of the apparatus (to the right as viewed in the figures) in the respective cam slots 40 of the operating lever 34. Further, the urging force of the return spring 35 acts on the pin 39 of the operating lever 34 via the button lever 36 to cause the operating lever 34 to turn, thereby causing the operating lever 34 to turn on the support points 37 from the position shown in FIG. 9 in the clockwise direction (in the direction of right-hand rotation) as viewed in the figure. At the same time, the rollers 43 (provided at three locations) of the cassette guide 15 also move toward the rear end of the apparatus along horizontal portions 41b of the respective holding parts 41. Since the pin 39 moves toward the left as viewed in FIG. 9 by the turn of the operating lever 34, the button lever 36 also moves accordingly. When the disk cassette 11 is further pressed, the rollers 43 of the cassette guide 15 move downward by a predetermined amount by moving along corresponding lower vertical portions 41c of the staircase-like edge portions of the holding parts 41. Thus, the cassette guide 15 is placed in the loaded state shown in FIG. 11 (the state in which the disk cassette 11 is placed in the load position).

Figure 6A:
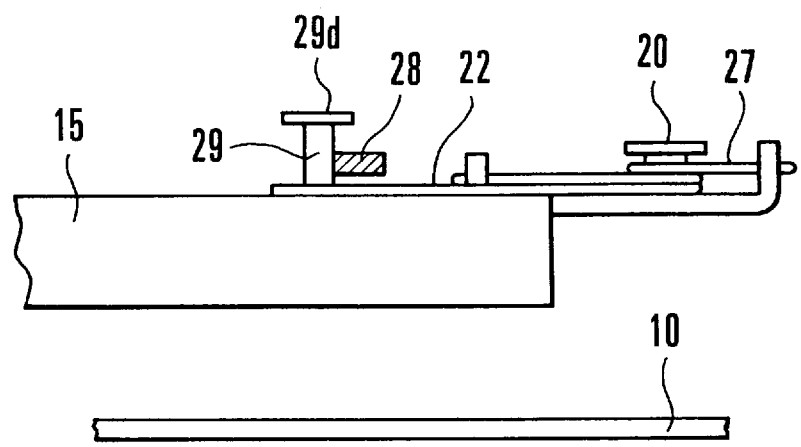
FIGS. 6(*a*) to 6(*d*) are explanatory views of the operation of a latch mechanism, FIGS. 6(*a*) and 6(*b*) show the present embodiment, while FIGS. 6(*c*) and 6(*d*) show one example of a related art, and FIGS. 6(*a*) and 6(*c*) show the state of the cassette guide when the disk cassette is in the unload position, while FIGS. 6(*b*) and 6(*d*) show the state of the cassette guide when the disk cassette is in the load position.
Figure 6B:
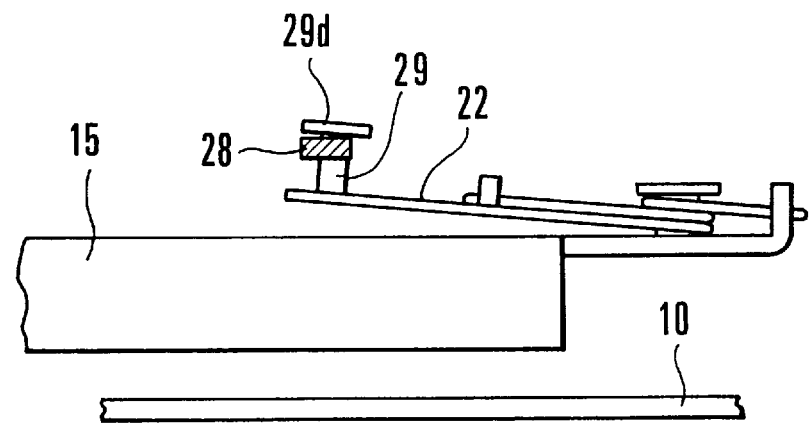
Figure 6C:
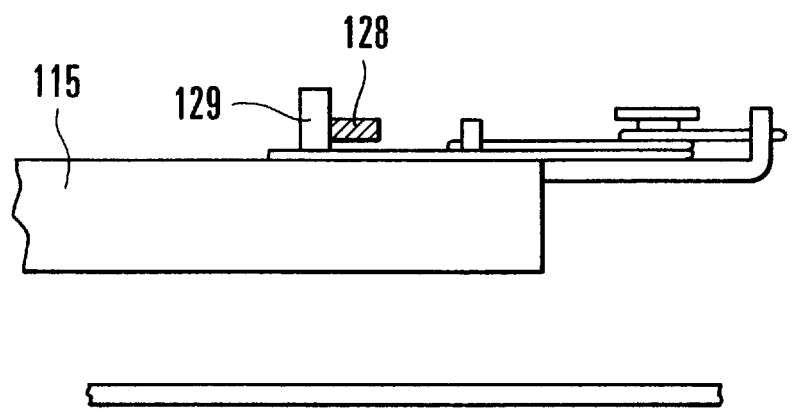
Figure 6D:
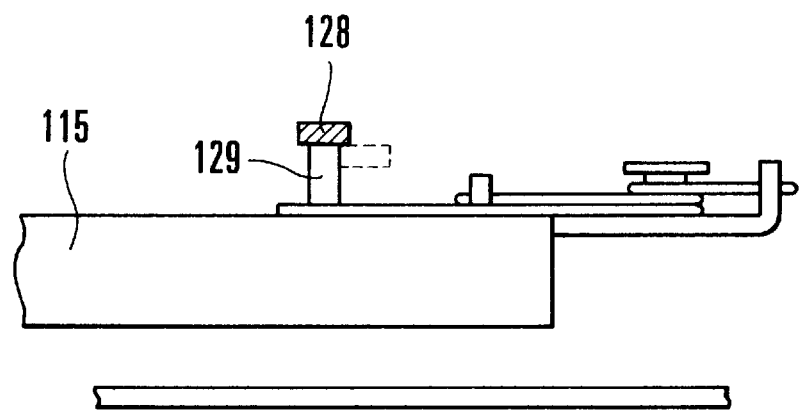

At this time, the stopper 28 provided above the base 10 (refer to FIG. 1) and the movement restricting member 29d of the pin 29 of the latch lever 22 are placed in contact with each other as shown in FIG. 6(b), so that the pin 29 is prevented from moving together with the cassette guide 15. Accordingly, the pin 29 is prevented from moving into an area below the stopper 28. Since the movement restricting member 29d has a disk-like shape, the movement restricting member 29d prevents the pin 29 from moving into a position below the stopper 28 irrespective of the position of abutment between the pin 29 and the stopper 28. It is to be noted that, as shown in FIG. 6(b), the end of the latch lever 22 at which the pin 29 is provided is lifted up compared to the position of the other end. Also, during this time, the side face 28b of the stopper 28 and the pin 29 of the latch lever 22 are kept in contact with each other so that the movement of the pin 29 is restricted.

During the loaded state in which the cassette guide 15 is moved down, the position of the cassette guide 15 with respect to the direction of disk-cassette insertion is restricted by the abutment of the rollers 43 of the cassette guide 15 with the respective lower holding portions (vertical portions) 41c of the staircase-like edge portions of the holding parts 41. In addition, during such a loaded state, the disk cassette 11 is positioned in the loaded state by the positioning pins 84 and the positioning faces 85, and the cassette guide 15 is urged in the downward direction by the downward urging force of the operating lever 34. Accordingly, the disk cassette 11 is positioned in such a way that its top face is pressed by a plurality of disk-cassette pressing projections 86 (refer to FIGS. 1 and 2) provided on the cassette guide 15, whereby the load position of the cassette guide 15 is restricted. If the cassette guide 15 is placed in the load position, the disk (to be exact, the hub) within the disk cassette 11 is magnetically attracted to the rotor of the motor 31 for disk driving (refer to FIG. 7(a)) and is also engaged with the center shaft 81 and the driving pin 82 on the rotor, whereby the disk (medium) is positioned in the direction of disk height and in the direction of disk rotation. Accordingly, the disk cassette 11 is set in the loaded state in which recording and reproduction of information on and from the disk are possible.

During the loaded state, the center pins 42 of the cassette guide 15 are respectively urged leftwardly obliquely in the downward direction as viewed in FIG. 11 by open-side end portions 40a of the upper cam surfaces of the corresponding cam slots 40 of the operating lever 34. In the above-described manner, the positions of the respective rollers 43 of the cassette guide 15 in the direction of disk-cassette insertion are restricted by the corresponding lower vertical portions 41c of the holding parts 41, and the cassette guide 15 is stably held with respect to the base 10.

During the loaded state, the cassette guide 15 is subject to a force which causes it to move upwardly toward the cassette inserting slot 12, by the spring 87 held between the cassette guide 15 and the operating lever 34.

When the disk cassette 11 set in the disk driving apparatus is to be ejected, the operator presses with the finger the eject button 14 (refer to FIGS. 3, 10 and 12) which has projected by a predetermined amount, to move the button lever 36 in the rearward direction against the return spring 35. When the button lever 36 is moved rearward, the operating lever 34 turns on the support points 37 from the position shown in FIG. 11 in the counterclockwise direction (in the direction of left-hand rotation) as viewed in the figure, by means of the engagement between the cutout 38 of the button lever 36 and the pin 39 of the operating lever 34. Then, the center pins 42 are lifted up by the respective cam slots 40 to cause the cassette guide 15 to move upward. When the eject button 14 is further pressed, the cassette guide 15 moves upward accordingly to disengage the rollers 43 from the respective lower holding parts (vertical portions) 41c, whereby the cassette guide 15 starts to move toward the front of the apparatus (to the left as viewed in FIG. 11) by the urging force of the spring 87.

As the cassette guide 15 moves, the pin 29 of the latch lever 22 also moves along the side face 28b of the stopper 28.

When the eject button 14 is further pressed, the shutter lever 21 and the latch lever 22 are made to turn rapidly in the counterclockwise direction (in the direction of left-hand rotation) by the urging forces of the respective return springs 25 and 27 (refer to FIGS. 1 and 2), thereby ejecting the disk cassette 11 in the forward direction and, at the same time, moving the cassette guide 15 in the forward direction. It is to be noted that an elastic member for urging the cassette guide 15 in the forward direction may also be provided for aiding in smooth movement of the cassette guide 15. As an example, in the present embodiment, the spring member 87 (refer to FIGS. 1 and 2) is disposed between the operating lever 34 and the cassette guide 15. Instead, the shutter spring 25 may also be utilized in such a manner that one end of the shutter spring 25 is secured to the operating lever 34 or to the base 10 or other fixed elements.

Figure 12:
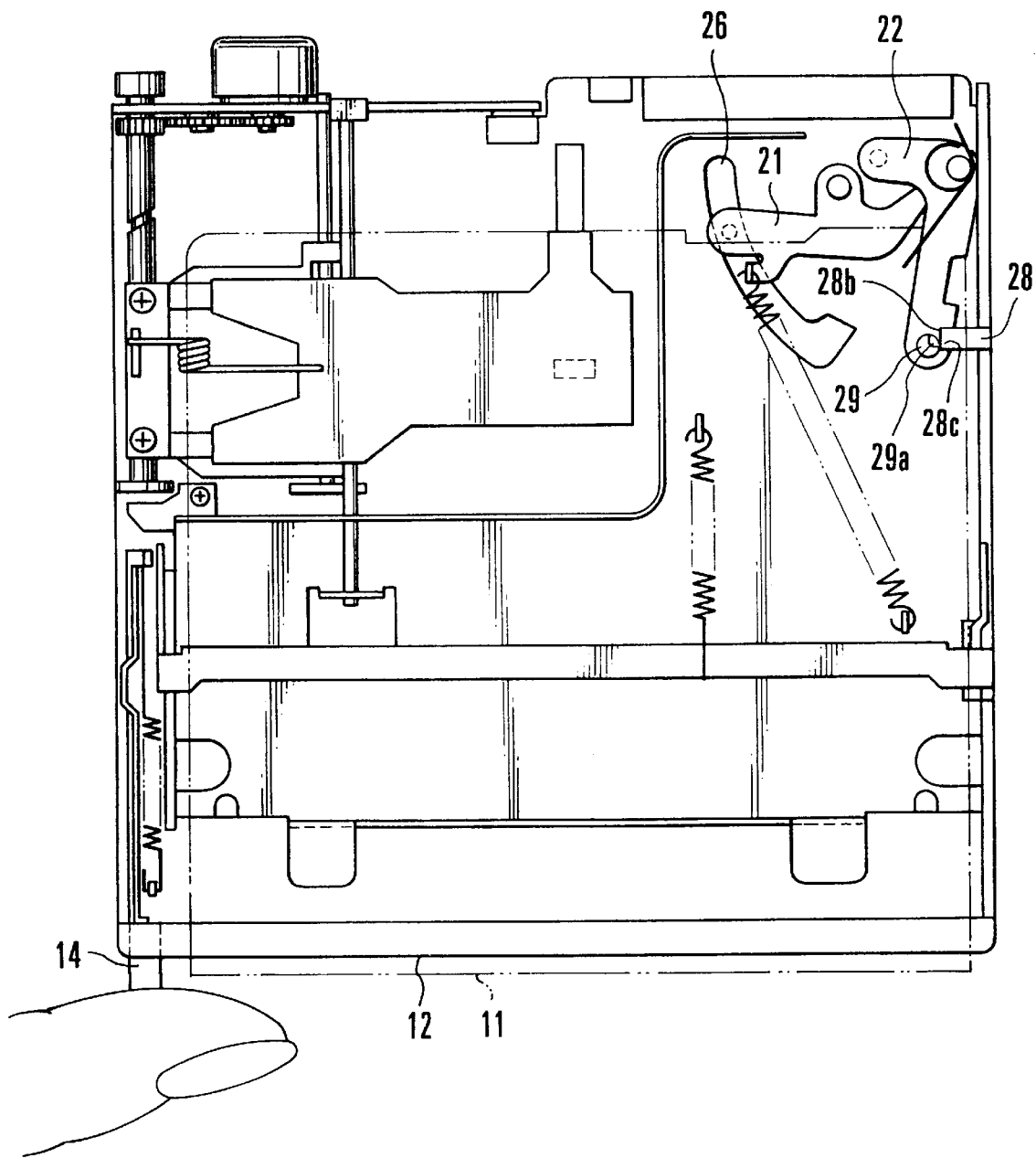
FIG. 12 is a diagrammatic top plan of the present embodiment, and shows the state of a finger pressing an eject button for ejecting purpose and the state of the disk cassette.

During the above-described ejecting operation, as shown in FIG. 12, if the operator presses the eject button 14 with the finger overlapping the cassette inserting slot 12, the finger is prevented from coming into contact with the end face of the disk cassette 11 which has been ejected from the cassette inserting slot 12. This is because the length of ejection of the eject button 14 is selected to be greater than the amount in which the disk cassette 11 is ejected from the cassette inserting slot 12 when the cassette guide 15 is moved to its uppermost position, i.e., when the pin 29 of the latch lever 22 is engaged with the side face 28b of the stopper 28.

Figure 13:
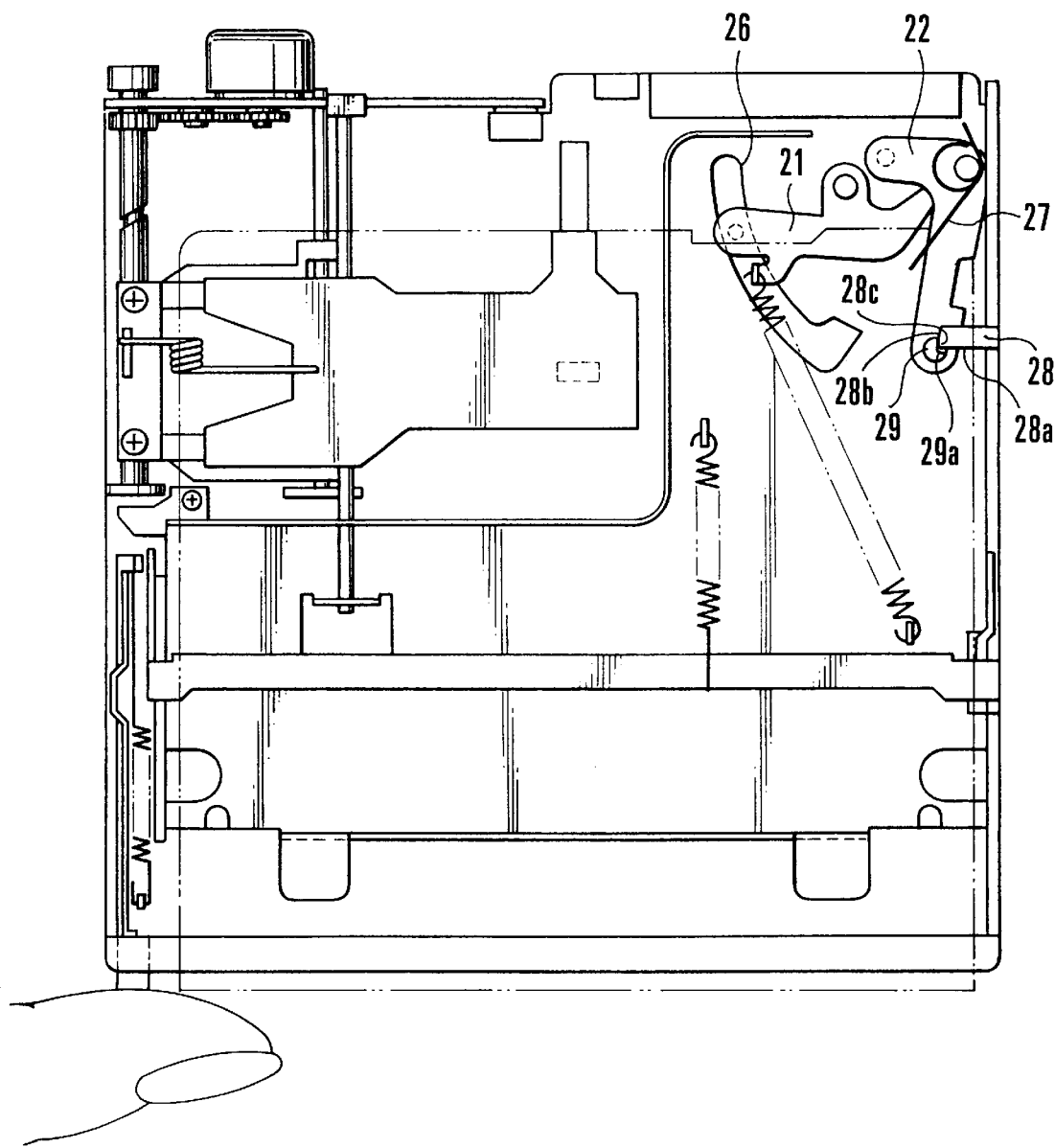
FIG. 13 is a diagrammatic top plan view of the present embodiment, and shows the relationship between a stopper and a pin when the disk cassette is ejected.

Even if the finger of the operator comes into contact with the end face of the disk cassette 11 to stop the ejection of the disk cassette 11 in the state shown in FIG. 13, the corner 28c of the stopper 28 engages with the recess 29a of the pin 29 by the urging force of the spring 27. The position of the engagement between the corner 28c and the recess 29a is set to a position at which the cassette guide 15 can be placed in the completely unloaded state.

When the pin 23 of the shutter lever 21 returns by moving along the slot 26, as shown in FIG. 1, the pin 23 of shutter lever 21 is brought into abutment with the forward end of the slot 26 to apply a returning force to the cassette guide 15. Thus, the cassette guide 15 is returned to the initial position shown in FIG. 9. When the pressing of the eject button 14 is stopped at that position, the button lever 36 and the operating lever 34 are returned to their initial positions (unload positions) shown in FIGS. 8 and 9 by the urging force of the return spring 35 (refer to FIGS. 8 and 10).

Figure 14:
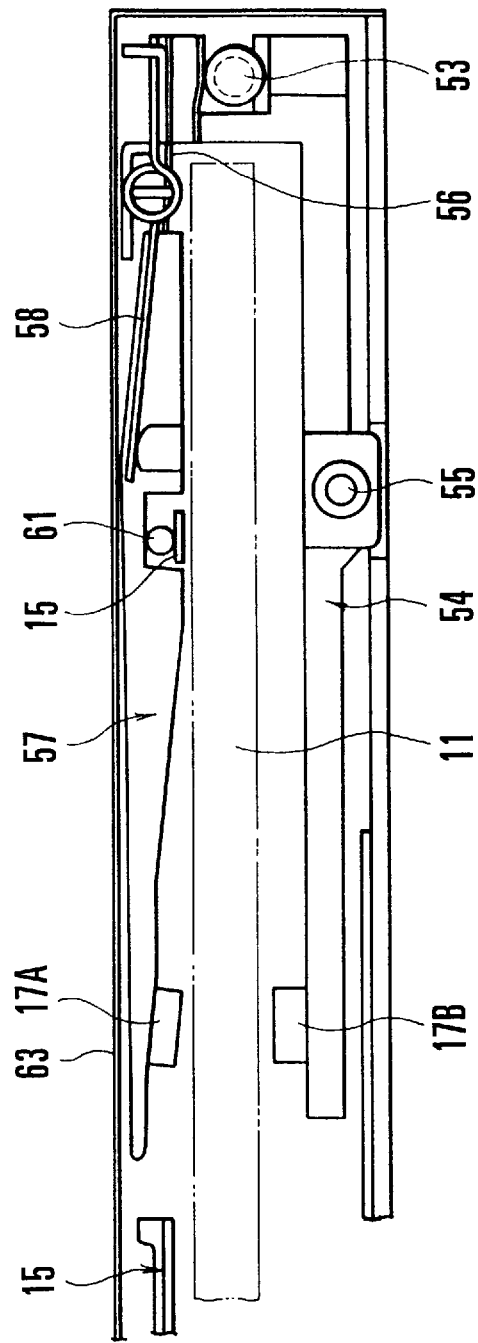
FIG. 14 is a vertical sectional view of a head seek mechanism portion, taken along line 1—1 of FIG. 1.

As shown in FIGS. 1 and 2, the head seek mechanism 18 is disposed in the area corresponding to the cutout portion 16 of the cassette guide 15. FIG. 14 is a vertical sectional view taken along line 1—1 of FIG. 1, of a portion including the head seek mechanism 18. The head seek mechanism 18 will be described below with reference to FIGS. 1, 2 and 14 as well as other associated drawings. In the shown example, the cutout portion 16 having an area corresponding to approximately ¼ of the entire area of the cassette guide 15 is formed in the left-hand half of the rear portion thereof. However, a corresponding cutout portion may be formed not in the left-hand half but in the right-hand half, in which case a mechanism corresponding to the head seek mechanism 18 may be provided within the right-hand cutout portion.

Referring to FIGS. 1 and 2, the cassette loading mechanism 33 and the head seek mechanism 18 are arrayed along one edge (in the shown example, the left-hand edge) of the disk cassette 11 in the inserting direction of the disk cassette 11, on the side on which the cassette loading mechanism 33 including the button lever 36 and the associated elements is disposed, that is, within the space that is formed adjacent to the one edge of the cassette guide 15 by displacing the cassette guide 15 with respect to the base 10 in one direction (in the shown example, in the right-hand direction).

The head seek mechanism 18 is provided with a head driving motor 51 fixed to the rear wall of the base 10, a driving shaft 53 made from a lead screw which is rotated by the motor 51 via a gear train 52, a head carriage 54 engaged with the lead groove of the driving shaft (lead screw) 53 and arranged in such a manner as to be movable in opposite directions along the length of the driving shaft 53 by the forward and reverse rotations of the driving shaft 53, a guide bar 55 engaged with the head carriage 54 for guiding the head carriage 54, a lower head 17B mounted on an extending end portion of the head carriage 54, a head arm 57 secured to the head carriage 54 via a leaf spring 56 in such a manner as to be movable in the upward and downward directions, the upper head 17A mounted on an extending end portion of the head arm 57, and a head loading spring 58 for urging the head arm 57 in the downward direction (toward a head load position).

Figure 15:
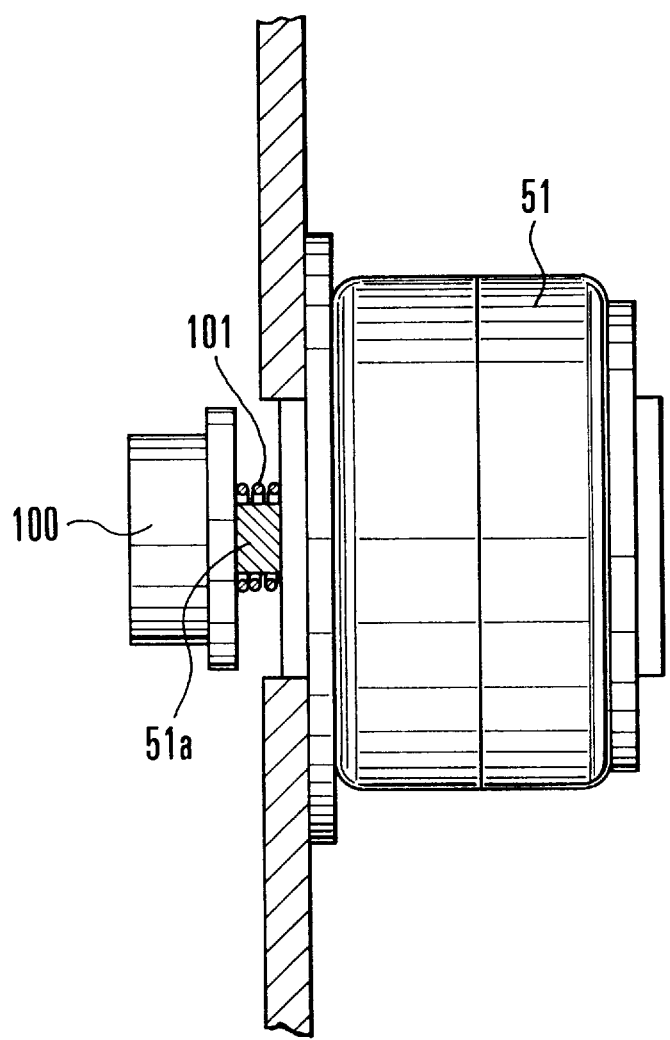
FIG. 15 is an enlarged view showing the essential portions of a driving-force transmitting mechanism for a head-carriage driving motor used in the present embodiment.

The output of the head driving motor 51 may be transmitted to the driving shaft 53 via a belt or the like. In this arrangement, as shown in FIG. 15, a spring 101 is disposed between the motor 51 and a pulley 100 fixed to an output shaft 51a of the motor 51, thereby eliminating an axial play which may occur between the motor 51 and the output shaft 51a. By adopting this arrangement, it is possible to prevent a vibration caused by the stepped driving of the stepping motor 51 and the axial play, as well as a noise caused by such a vibration. Further, since the position of the pulley 100 is stabilized by the pressure of the spring 101, it is possible to prevent the position of the pulley 100 from varying back and forth in the axial direction thereof owing to the axial play during each of the forward and reverse rotations of the stepping motor 51. Accordingly, the engagement of the belt with the pulley 100 is stabilized to prevent the belt from coming off the pulley 100. It is to be noted that even if a gear transmission mechanism is substituted for the belt transmission mechanism, similar advantages can be achieved.

Figure 16A:
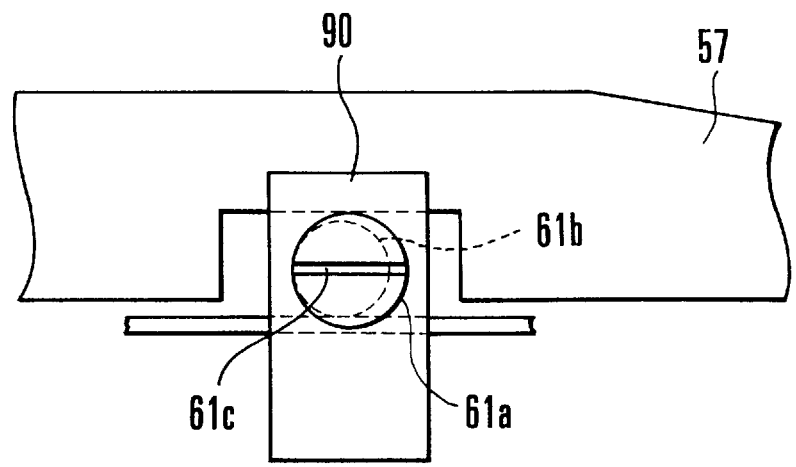
FIG. 16(a) is an explanatory view showing a height adjusting mechanism for a head arm according to the present embodiment.
Figure 16B:
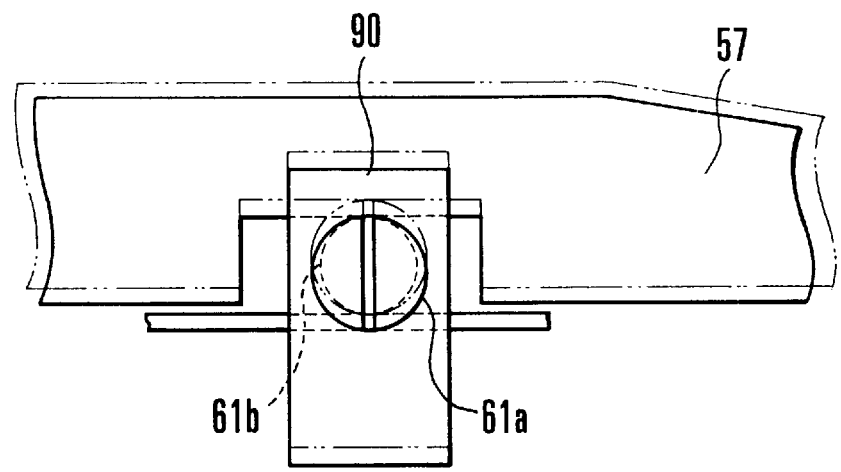
FIG. 16(b) is a view which serves to explain a method of adjusting the height of the head arm according to the present embodiment.

On the side on which the cutout portion 16 is formed in the cassette guide 15, the bar 61 for head lifting (head unloading) extends past the underside of the head arm 57 and, as shown in FIGS. 16(a) and 16(b), the bar 61 includes a shaft portion 61a and a shaft portion 61b. The shaft portion 61a has a groove 61c formed at one end so that a tool, such as a screw driver, can be made to engage with the groove 61c, while the shaft portion 61b is made eccentric by a predetermined amount with respect to the shaft 61a. A holder 90 is attached to the one end of the shaft portion 61a, and the bar 61 for head lifting (head unloading) is secured in such a manner that one end of the shaft portion 61b is fixed to the cassette guide 15. As shown in FIGS. 16(a) and 16(b), the bar 61 is rotated, as by fitting the tool, such as a screw driver, into the groove 61c, whereby the position of the head arm 57 is adjusted in the height direction. As shown by solid lines in FIGS. 17(a) and 17(b), the bar 61 is arranged in such a manner that a bottom 90b of the holder 90 engages with the base 10 when the head means 17 is unloaded. One side portion of the holder 90 is formed as an elastic portion 90a so that the holder 90 can easily engage with the base when the head means 17 is unloaded.

With the above-described arrangement, during the cassette-unloaded state in which the cassette guide 15 is moved upward, the head arm 57 is lifted to the upper position shown in FIG. 14 so that the upper head 17A is held in the unload position. The bar 61 is arranged to support the head arm 57 approximately at the middle position between the point where the head arm 57 is secured and the point on the head arm 57 where the upper head 17A is held, thereby making it possible to reduce the thickness of the apparatus without impairing a force resisting the urging force of the spring 58.

Figure 17A:
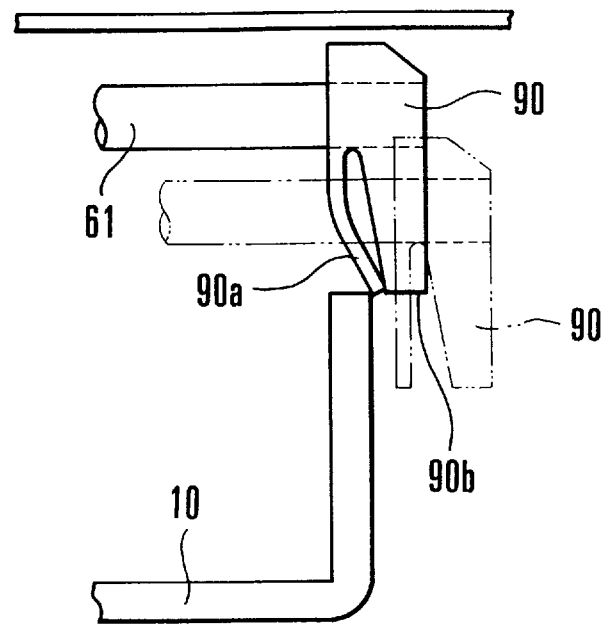
FIG. 17(a) is a schematic view showing the state of movement of a bar for unloading the head arm according to the present embodiment.
Figure 17B:
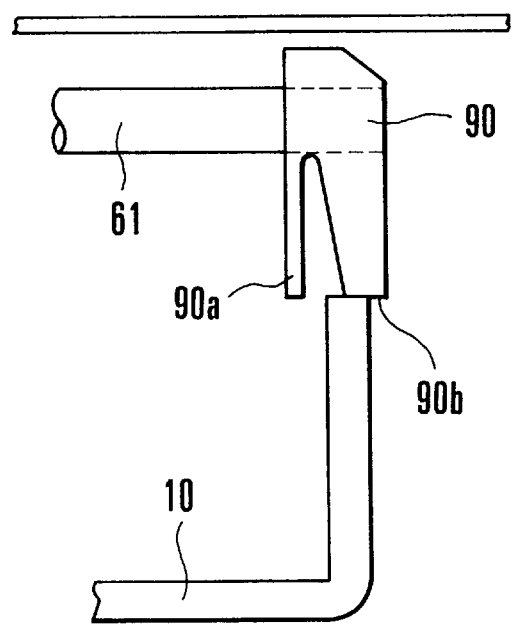
FIG. 17(b) is a schematic view showing the state of the head arm being unloaded, i.e., the state in which the bottom of a holder of the bar is engaged with a base.

The behavior of the holder 90 while the head means 17 is moving to the unload position will be described below in detail. During this operation, as described previously, the cassette guide 15 is made to move upward and, at the same time, the bar 61 moves upward and toward the base 10 as shown in FIG. 17(a). Immediately before the holder 90 reaches the shown in FIG. 17(b), since the holder 90 comes into contact with a side wall of the base 10, the movement of the holder 90 is hindered. However, the elastic portion 90a of the holder 90 forms an inclined surface by being bent by the moving force of the bar 61, whereby smooth movement of the holder 90 can be effected.

As described previously, the bar 61 has the eccentric shaft portion 61b. If the disk cassette 11 is inserted in the state of the upper head 17A being placed in the unload position and a screw driver is fitted into the groove 61c of the bar 61, since the eccentric shaft portion 61b is engaged with the cassette guide 15, the head arm 57 can be moved up and down by the amount of the eccentricity of the eccentric shaft portion 61b, as shown in FIG. 16(b), by rotating the screw driver fitted in the groove 61c. That is, the position of the upper head 17A can be adjusted.

As described previously, the disk driving apparatus according to the present embodiment is arranged in such a manner that the upper head 17A and the lower head 17B can be loaded onto the upper and lower sides of the medium (disk) enclosed in the disk cassette 11, respectively, at the same time. In FIG. 14, there is shown the state in which the cassette guide 15 and the upper head 17A and the lower head 17B are placed in their unload positions. During the state shown in FIG. 14, the upper face (the highest portion) of the cassette guide 15 and the upper face (the highest portion) of the head arm 57 are made approximately equal in height, i.e., approximately flush with each other. Further, in the present embodiment, the gap between the upper face of the cassette guide 15 or the upper face of the head arm 57 and a cover 63 which covers the open top side of the base 10 is made as small as possible, as shown in FIG. 14, so that the height (thickness) of the disk driving apparatus can be made as smaller as possible.

According to the present embodiment described hereinabove, in the disk driving apparatus which is arranged to perform recording or reproduction of information on or from the disk, which serves as a recording medium, by causing the upper and lower heads 17A and 17B to move in a predetermined direction on the disk while causing the disk to rotate, there is provided head loading/unloading means which includes the bar 61 held at one end by the cassette guide 15 and the holder 90 attached to the other end of the bar 61, so that the holder 90 can be reliably brought into engagement with the base 10 when the disk cassette 11 is placed in the unloaded state. Accordingly, it is possible to keep constant the gap between the lower head 17B and the upper head 17A during the unloaded state irrespective of the radial position of the head means 17, whereby a reduction in the thickness of the apparatus can be achieved. Further, the reliability of the apparatus can be improved.

The above-described present invention is particularly effective for an apparatus the size and thickness reductions of which are desired. However, even if the present invention is applied to an apparatus the size and thickness reductions of which are not particularly desired, the invention is effective in improving the operability or operation of the apparatus.

What is claimed is:

1. A disk driving apparatus which is arranged to record or reproduce information on or from a recording medium of disk-like shape accommodated in a cassette, by causing a head to move in a predetermined direction while causing the recording medium to rotate, comprising:

(a) a cassette guide for receiving the cassette, said cassette guide having, on opposite sides thereof, first and second inserting guides for guiding insertion of the cassette, a portion corresponding to a movement path portion for the head being eliminated from said cassette guide to form a space which serves as a movement path space for the head, the first inserting guide of said cassette guide, which is positioned on a side on which the movement path space for the head is formed and which, based upon the movement path space, is made shorter than and is positioned below the second inserting guide, having a projection on a rearmost end portion of the first inserting guide so that the cassette can be supported on the projection;

(b) a base for holding said cassette guide movably in an inserting direction of the cassette and in a direction perpendicular to the inserting direction so as to cause the cassette to move between a load position and a standby position;

(c) a head carriage which holds a first head and a second head and which is movable in a radial direction of the recording medium, said head carriage having a head arm for holding the second head in opposition to the first head, said head carriage being disposed in such a manner that a longitudinal direction of said head carriage is approximately perpendicular to a moving direction of said head carriage;

(d) moving means for causing the second head to move between a first position where recording or reproduction of information on or from the recording medium is possible and a second position wherein recording or reproduction of information on or from the recording medium is impossible, said moving means having a supporting portion for supporting the head arm transversely to the moving direction of said head carriage when the second head is positioned in the second position, a part of the supporting portion being provided with a supporting-portion holding member having an elastic part, the supporting portion having a plurality of shafts of different diameters which are eccentrically and axially connected to each other;

(e) a panel attached to said base and having an opening for insertion of the cassette and a push button which operably projects from said pane, the push button having a variable amount of projection which varies between the standby position and the load position of the cassette;

(f) transportation means for executing, when said push button is pressed, a transporting operation for transporting said cassette guide to cause the cassette to move from the load position to the standby position;

(g) ejecting means for ejecting the cassette in interlocked relation to the transporting operation;

(h) a stopper provided on said base;

(i) a latch lever located on and turnably supported on said cassette guide;

(j) a pin provided on said latch lever, said pin having a movement restricting part on a top of the pin to prevent said pin and said stopper from disengaging from each other in the direction perpendicular to the inserting direction, said pin and said stopper being engaged with each other when the cassette is in an ejected state wherein the amount of projection of the cassette from said panel is approximately the same as the amount of projection of said push button from said panel; and (k) urging means for urging said latch lever in a direction in which said pin is brought into abutment with said stopper at all times.

2. A disk driving apparatus according to claim 1, wherein said pin has an engagement recess engageable with said stopper.

3. A disk driving apparatus according to claim 1, wherein said movement restricting part has a disk-like shape.

* * * * *

UNITED STATES PATENT AND TRADEMARK OFFICE
CERTIFICATE OF CORRECTION

PATENT NO. : 5,808,831
DATED : September 15, 1998
INVENTOR(S) : Jun Tanaka

It is certified that error appears in the above-identified patent and that said Letters Patent is hereby corrected as shown below:

Title page, Item [63], after "Continuation of Ser. No. 386,138, Feb 9, 1995, abandoned" insert --,which is a continuation of Ser. No. 098,608, July 7, 1993, abandoned--.

Signed and Sealed this

Thirtieth Day of March, 1999

Attest:

Q. TODD DICKINSON

Attesting Officer

Acting Commissioner of Patents and Trademarks